(12) United States Patent
Peters et al.

(10) Patent No.: US 7,020,580 B2
(45) Date of Patent: Mar. 28, 2006

(54) METHOD AND SYSTEM TO FACILITATE REPORTING RESULTS OF A DEFECT INSPECTION

(75) Inventors: Gerret Martin Peters, South Lyon, MI (US); Edmund Nizio, Macomb, MI (US); Kenneth Nolan Ely, Belleville, MI (US); Timothy W. March, Wixom, MI (US)

(73) Assignee: Ford Motor Company, Dearborn, MI (US)

( * ) Notice: Subject to any disclaimer, the term of this patent is extended or adjusted under 35 U.S.C. 154(b) by 301 days.

(21) Appl. No.: 10/617,314

(22) Filed: Jul. 10, 2003

(65) Prior Publication Data

US 2004/0117131 A1 Jun. 17, 2004

Related U.S. Application Data

(60) Provisional application No. 60/395,252, filed on Jul. 12, 2002.

(51) Int. Cl.
*G06F 11/30* (2006.01)

(52) U.S. Cl. .......................... 702/183; 715/716; 714/48
(58) Field of Classification Search ............. 702/34–36, 702/81–84, 150, 157–158, 182–185; 715/716–717, 715/719–721, 727–729; 714/25, 46, 48, 57; 73/7–8, 865.8, 866.3
See application file for complete search history.

(56) References Cited

U.S. PATENT DOCUMENTS

| | | | |
|---|---|---|---|
| 5,009,833 A | 4/1991 | Takeuchi et al. ............. 376/217 |
| 5,107,497 A | 4/1992 | Lirov et al. ..................... 714/26 |
| 5,193,143 A | 3/1993 | Kaemmerer et al. .......... 706/45 |
| 5,249,260 A | 9/1993 | Nigawara et al. ............. 706/45 |
| 5,315,502 A | 5/1994 | Koyama et al. ............... 700/79 |
| 5,394,543 A | 2/1995 | Hill et al. ..................... 714/26 |
| 5,404,503 A | 4/1995 | Hill et al. ..................... 714/31 |
| 5,488,697 A | 1/1996 | Kaemmerer et al. .......... 706/46 |
| 5,623,109 A | 4/1997 | Uchida et al. ............. 73/865.9 |
| 5,680,328 A * | 10/1997 | Skorupski et al. ............ 701/35 |
| 5,726,705 A | 3/1998 | Imanishi et al. ............... 348/92 |
| 5,817,958 A | 10/1998 | Uchida et al. ............. 73/865.9 |
| 6,049,453 A * | 4/2000 | Hulsebosch .................. 361/686 |
| 6,052,631 A * | 4/2000 | Busch et al. .................. 701/29 |
| 6,505,106 B1 * | 1/2003 | Lawrence et al. ............ 701/35 |
| 6,725,201 B1 * | 4/2004 | Joao ............................... 705/4 |
| 6,826,497 B1 * | 11/2004 | Collins ........................ 702/81 |
| 6,832,183 B1 * | 12/2004 | Barich et al. ................. 703/22 |
| 2003/0139836 A1 * | 7/2003 | Matthews et al. .......... 700/110 |

OTHER PUBLICATIONS

A Knowledge Based System for Process Control, by Thomas Cord.

* cited by examiner

*Primary Examiner*—Marc S. Hoff
*Assistant Examiner*—Mary Catherine Baran
(74) *Attorney, Agent, or Firm*—David B. Kelley; Brooks & Kushman

(57) ABSTRACT

An invention to facilitate reporting results of a defect inspection. The defect inspection can relate to paint defects, structural defects, dimensional defects, and other defects. The invention is suited to products having multiple body portions. A portable computer displays multiple body portions to an inspector to facilitate reporting defects. A computer receives defect data from the portable computer to facilitate analyzing the reported defects.

18 Claims, 8 Drawing Sheets

| | | Last Done | Done By |
|---|---|---|---|
| Monthly Tasks | | | |
| Voice of the Customer | | | |
| VRT Review | | | |
| | | Last Done | Done By |
| Daily Tasks | | | |
| Internal Quality Indicators | | | |
| Data Collection | | 06-02-2003 | TMANNS |
| Charting/Analysis | | 06-02-2003 | TMANNS |
| Defect Actions | | | |
| | | Last Done | Done By |
| Material Reference | | | |
| Dirt Team | | | |
| Defect Library | | | |
| Reaction / Containment Plans | | | |
| Control Plans | | | |
| Maintenance Actions | | | |

FIG.6

| Analysis Daily Tasks | | Last Done | Done By |
|---|---|---|---|
| ECoat Before Scuff Chart | ☑ | 06-02-2003 | TMANNS |
| Prime Before Scuff Chart | ☑ | 06-02-2003 | TMANNS |
| PRime After Scuff Chart | ☑ | | |
| Top Coat-All Booths Chart | ☑ | 06-02-2003 | TMANNS |
| Top Coat Booth 1 Chart | ☑ | 06-02-2003 | TMANNS |
| Top Coat Booth 2 Chart | ☑ | 06-02-2003 | TMANNS |
| After Polish Chart | | 06-02-2003 | TMANNS |
| Dirt By Layer Pareto | | | |
| Dirt By Body Portion Pareto | | | |
| Analysis Weekly Tasks | | | |
| Dirt Defect Type by Layer Pareto | | | |
| Dirt Overlay | | | |

METHOD AND SYSTEM TO FACILITATE REPORTING RESULTS OF A DEFECT INSPECTION

CROSS-REFERENCE TO RELATED APPLICATIONS

This application claims the benefit of U.S. provisional application Ser. No. 60/395,252 filed Jul. 12, 2002.

BACKGROUND OF THE INVENTION

1. Field of the Invention

The present invention relates to methods and systems to facilitate reporting results of a defect inspection. In particular, the present invention relate to such methods and system which utilize a portable computer to facilitate the reporting.

2. Background Art

Automobiles, kitchen appliances, and other products include multiple body portions. The body portions are the outwardly visible portions of the product. For example, the multiple body portions of a vehicle include a hood, a roof, a truck, a front quarter panel, a rear corner panel, and a door.

The appearance of the product is affected by the appearance of the body portions. Defects can negatively affect the appearance. Common defects include foreign contaminant defects, paint defects, rust defects, weld defects, structural defects, such as dents and scratches, and others. The customer prefers the product to be defect free. Accordingly, there exists a need to inspect the multiple body portions for defects.

In the past, the body portions were inspected in a paper reporting process. The paper reporting process generally comprised inspecting each body portion and recording defects on a piece of paper. The inspector files the paper indicating the defects in a filing cabinet for later use. When needed, the inspector retrieves the defect papers to analyze the manufacturing process.

The appearance of the body portions is critical to customers satisfaction. The paper reporting process can makes analysis of the body portions a time consumer process. Because the defect data is recorded on a piece of paper, the inspector must manually perform a number of time consuming tasks to make use of the manually recorded defect data. Accordingly, there exists a need to report defects in a less time consuming manner.

SUMMARY OF THE INVENTION

The present invention relates to an invention to facilitate reporting results of a defect inspection. The defect inspection can relate to paint defects, structural defects, dimensional defects, and other defects. The present invention is suited to products having multiple body portions. The multiple body portions are displayed to an inspector to facilitate reporting defects. In this manner, the needs identified above are addressed with the present invention.

One aspect of the present invention relates to a portable computer. The portable computer is preferably a hand-held personal digital assistant. The portable computer includes a screen an inspector can view. The screen permits the inspector to view a graphically user interface. The graphical user interface graphically displays multiple body portions of the product and each body portion is selectable so that the displayed body portions correspond with the inspected product.

The portable computer includes a receiver to receive a defect input from the inspector. The defect input indicates a defect in one or more of the displayed body portions. The screen can be a touch screen. The inspector clicks on the touch screen to indicate which one or more of the displayed body portions has the defect. The receiver can also be an audible unit for receiving voice commands from the inspector. The audible unit allows the inspector to call out which one or more of the displayed body portions has the defect.

The portable computer includes a processing means to generate defect data. The defect data represents which body portion has the defect. The processing means can include defect description data with the defect data. The graphical user interface can provide a defect description menu for use by the inspector to select a defect description. The defect description is processed by the processing means to become part of the defect data. In addition, the graphical user interface can operate in conjunction with the touch screen to provide a comment field wherein the inspector can electronically write comments. Likewise, the audible unit can convert voice commands to similar comments. The processing means includes the written and audible comments with the defect data.

One aspect of the present invention relates to a system to facilitate reporting results of a defect inspection. The system comprises a computer and the portable computer described above. The portable computer stores the defect data for transfer to the computer. The computer receives the defect data and provides processing of the defect data to facilitate analyzing the defects.

The computer provides a number of weekly tasks to facilitate analyzing the defect data on a weekly basis. The number of weekly tasks require an inspector to execute each task to receive a check mark. A check mark is received to indicate completion of the task such that a supervisor can review the check mark to determine whether the inspector is analyzing the defect data on a regular basis. In addition, the computer can automatically provide predefined defect charts to further facilitate analyzing the defect data. One of the weekly tasks can include analyzing the predefined defect charts in order to receive a check mark for that portion of the weekly task.

BRIEF DESCRIPTION OF THE DRAWINGS

FIG. 6 illustrates a fifth screen display of a computer used to facilitate reporting results of a defect inspection;

FIG. 7 illustrates a seventh screen display of the computer;

FIG. 9 illustrates a dirt overlay chart generated by the computer; and

FIG. 10 illustrates a customized chart generation display for use with the computer.

DETAILED DESCRIPTION OF THE PREFERRED EMBODIMENT(S)

Figure 1:
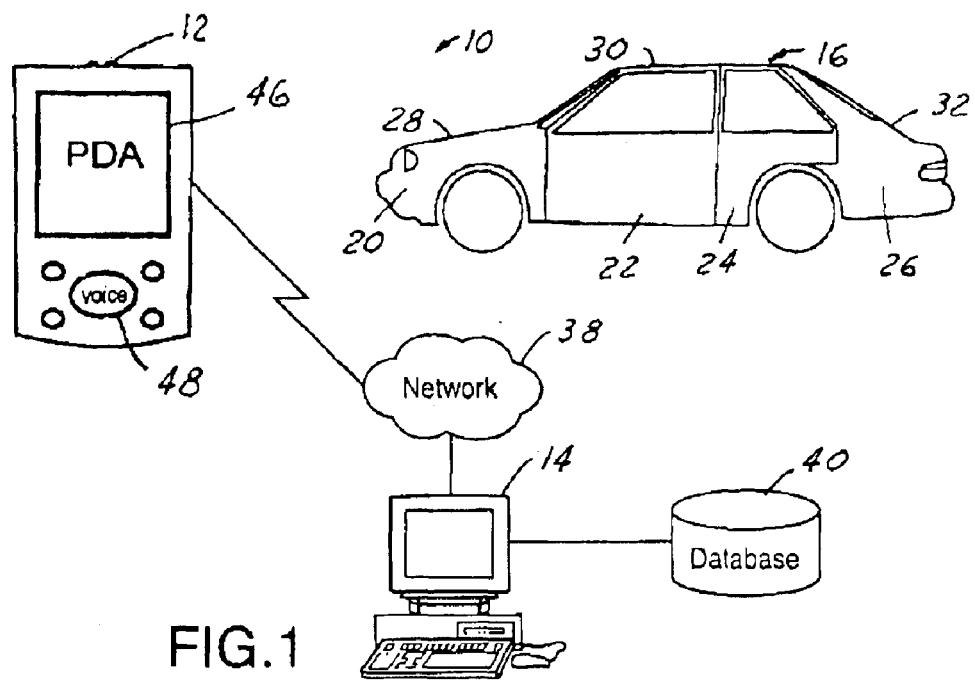
FIG. 1 illustrates a system to facilitate reporting results of a defect inspection.

FIG. 1 illustrates a system 10 in accordance with the present invention. The system 10 comprises a portable computer 12, a computer 14, and a product 16. The system 10 facilitates reporting results of an inspection of the product 16.

The product 16 shown is an automobile. The automobile includes multiple body portions, including a front quarter portion 20, a front door portion 22, a rear door portion 24, a rear quarter portion 26, a hood portion 28, a roof portion 30, and a trunk portion 32. The reporting of a defect in the multiple body portions is facilitated by the system 10.

The reported defects can include foreign contaminant defects, paint defects, rust defects, weld defects, structural defects, such as dents and scratches, and others. The present description relates to the utilization of the system with respect to facilitating the reporting of a defect inspection of the product being an automobile.

The description is not intended to limit the present invention to automobiles. Rather, the system can be used to facilitate reporting the results of defect inspections of other products. The other products can include appliances—such as washing machines, refrigerators, dryers, dishwashers—and vehicles—such as boats, planes, campers, helicopters, buses—and any other item which includes multiple body portions. Preferably, the multiple body portions are viewable by the inspector and the customer.

The system can further comprise a network 38 and a database 40. The network 38 facilitates the communication between the portable computer 12 and the computer 14. The network 38 is optional, and in its absence, the portable computer 12 can communicate directly with the computer 14 through a docking procedure or a wireless procedure. The database 40 maintains data received by the computer 14. Data can be added to and removed from the database 40 to analyze the results of various defect inspections.

Preferably, the defect inspections occur with respect to the painting portion of an automobile manufacturing process. In this manner, the computer 14 and the database 40 can be used to store data to facilitate analysis of the manufacturing process. The portable computer 12 preferably is a hand-held personal digital assistant. The portability of the portable computer 12 allows the inspector to walk through an assembly plant to inspect the vehicle 16 at different stages in the manufacturing process. The inspector can inspect a number of vehicles 16 and then return to the computer 14 to use the portable computer 12 to report the results of the defect inspection.

Figure 2:
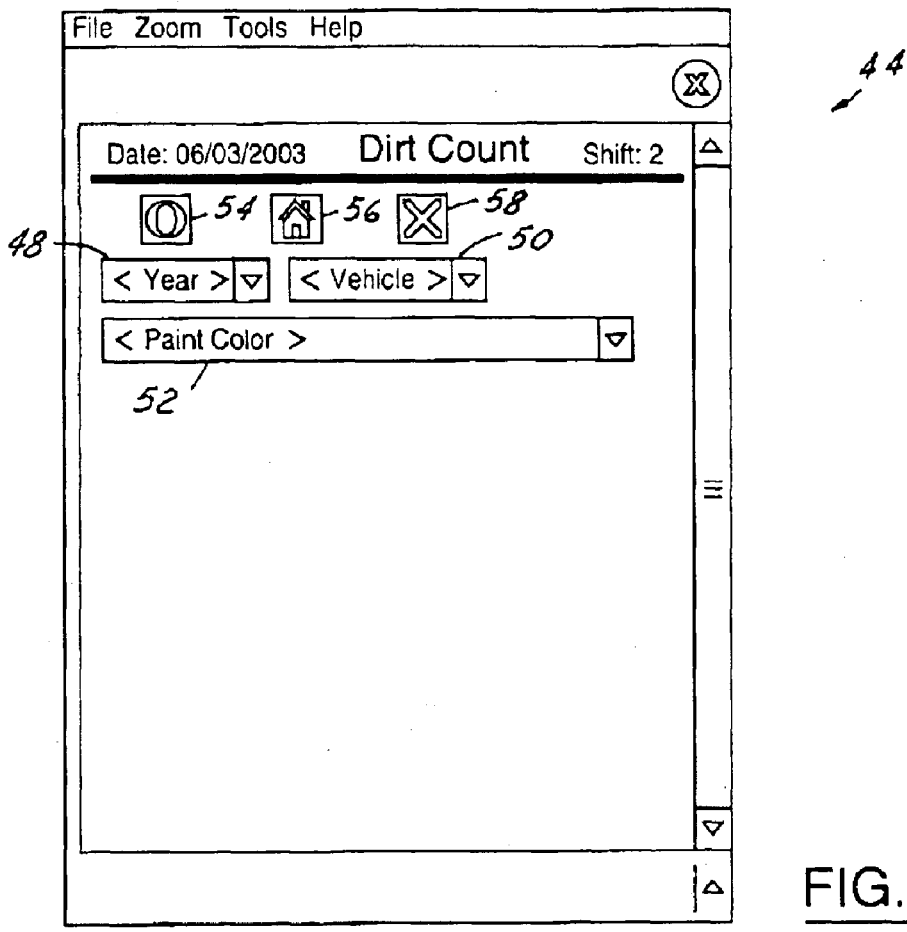
FIG. 2 illustrates a first screen display of a portable computer used to facilitate reporting results of a defect inspection.

FIG. 2 illustrates a first screen display 44 of the portable computer 12. The screen display 44 is viewable by a screen 46 of the portable computer 12. The portable computer 12 is programmed with a graphical user interface to generate the screen display 44. The graphical user interface is a tool the inspector can use to facilitate the reporting of the results of the defect inspection. The portable computer 12 preferably includes a processing means to support the graphical user interface.

The graphical user interface shown in FIG. 2 illustrates the first screen display 44. The first screen display 44 generally relates to product selection. The first screen display 44 provides a vehicle year menu 48, vehicle model menu 50, and a vehicle paint color menu 52. The parameters of the vehicle to be inspected are selected from the menus.

The inspector can make the selections with a pointing device or voice commands. The screen 46 can be a touch screen to permit the inspector to click on the menus to make the selection. Alternatively, the portable computer can include an audible device 48 for receiving voice commands from the inspection. The processing means interprets the voice commands and selects the criterion from the menu as if the pointing device was used to click on a touch screen. The portable computer 12 can also include a hybrid configuration which can make use of the touch screen functionality and the voice command functionality.

A circle acts like the enter button entering the data for that screen. A house button 56 is a home link taking the inspector back to the first screen display 44 of FIG. 2. A X button 58 deletes the information for that screen.

Figure 3:
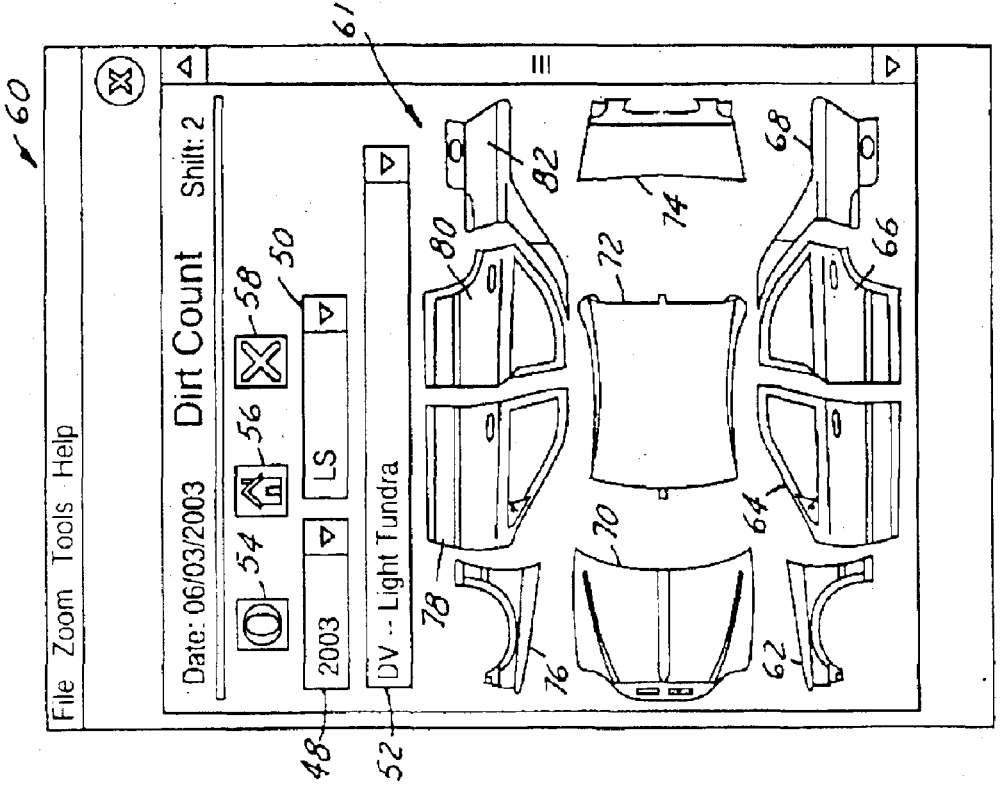
FIG. 3 illustrates a second screen display of the portable computer.

FIG. 3 illustrates a second screen display 60 which appears with selection of the circle button. The second screen display 60 generally relates to displaying multiple body portions of the vehicle selected in FIG. 2. In FIG. 3, the criterion corresponding with a vehicle model year of 2003, a vehicle type of LS, and a paint color of DV-Light Tundra" is displayed. A corresponding vehicle body display 61 includes the multiple body portions comprising the selected vehicle.

The multiple body portions include a first-side front quarter portion 62, a first-side front door portion 64, a first-side rear door portion 66, a first-side rear quarter portion 68, a hood portion 70, a roof portion 72, a trunk portion 74, a second-side front quarter portion 76, a second-side front door portion 78, a second-side rear door portion 80, and a second-side rear quarter portion 82. The inspector can click on each one of the multiple body portions to indicate a defect.

Figure 4:
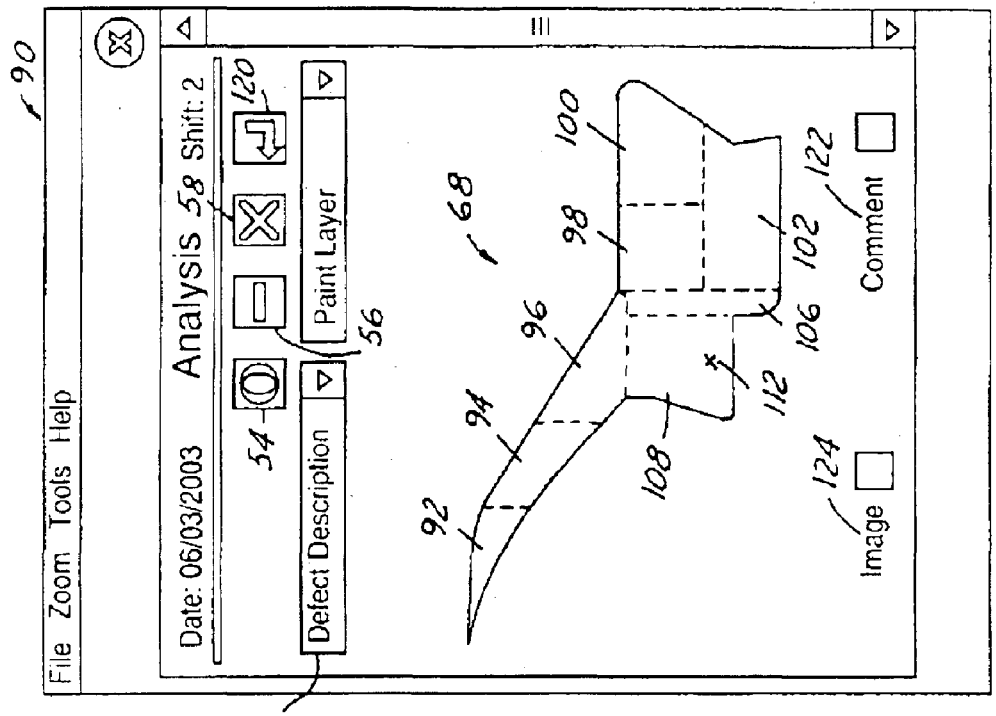
FIG. 4 illustrates a third screen display of the portable computer.

FIG. 4 illustrates a third screen display 90. The third screen display 90 generally relates to inputting a defect. More specifically, the third screen display 90 relates to inputting a defect for the first-side rear quarter portion 68. The inspector clicks on the first-side rear quarter portion 68 in FIG. 3 to display the portion shown in FIG. 4.

The third screen display 90 divides the first-side rear quarter portion into a number of small portions, which are referred with reference numerals 92, 94, 96, 98, 100, 102, 104, 106, and 108. The inspector clicks on the smaller portion corresponding with the defect. The clicked on smaller portion produces a defect input 112. As shown, portion 112 was clicked on to indicate a defect. In response, the processing means generates defect data for the defect input. The defect data represents which body portion has the defect.

A paint defect description menu 114 and a paint layer menu 116 are provided. The inspector selects a paint defect description from the paint defect description menu 114 and a paint layer from the paint layer menu 116 after clicking on portion 112. The processing means includes the selected paint defect description and the selected paint layer with the defect data. This information is associated with the defect for subsequent analysis and reporting.

The inspector can click on another portion of the first-side rear quarter portion shown in FIG. 4 to add additional defects. The menus reset with each click on one of the body portions so that the new defect can be entered. The third screen is exited when all defects are reported for the first-side rear quarter portion. To exit, the inspector clicks on a return button 120. The second screen display 60 is returned to in response to clicking on the return button 120.

A comment link 122 allows the inspector to add additional defect description. The additional defect description is included with the defect data. The comment link can be actuated by the pointing device or a voice command. A comment field appears with actuation in which the inspector can use the pointer device to write on the touch screen or dictate comments by way of the audible unit. An image link 124 allows the inspector to note that an image (photo) has been captured for the defect.

Figure 5:
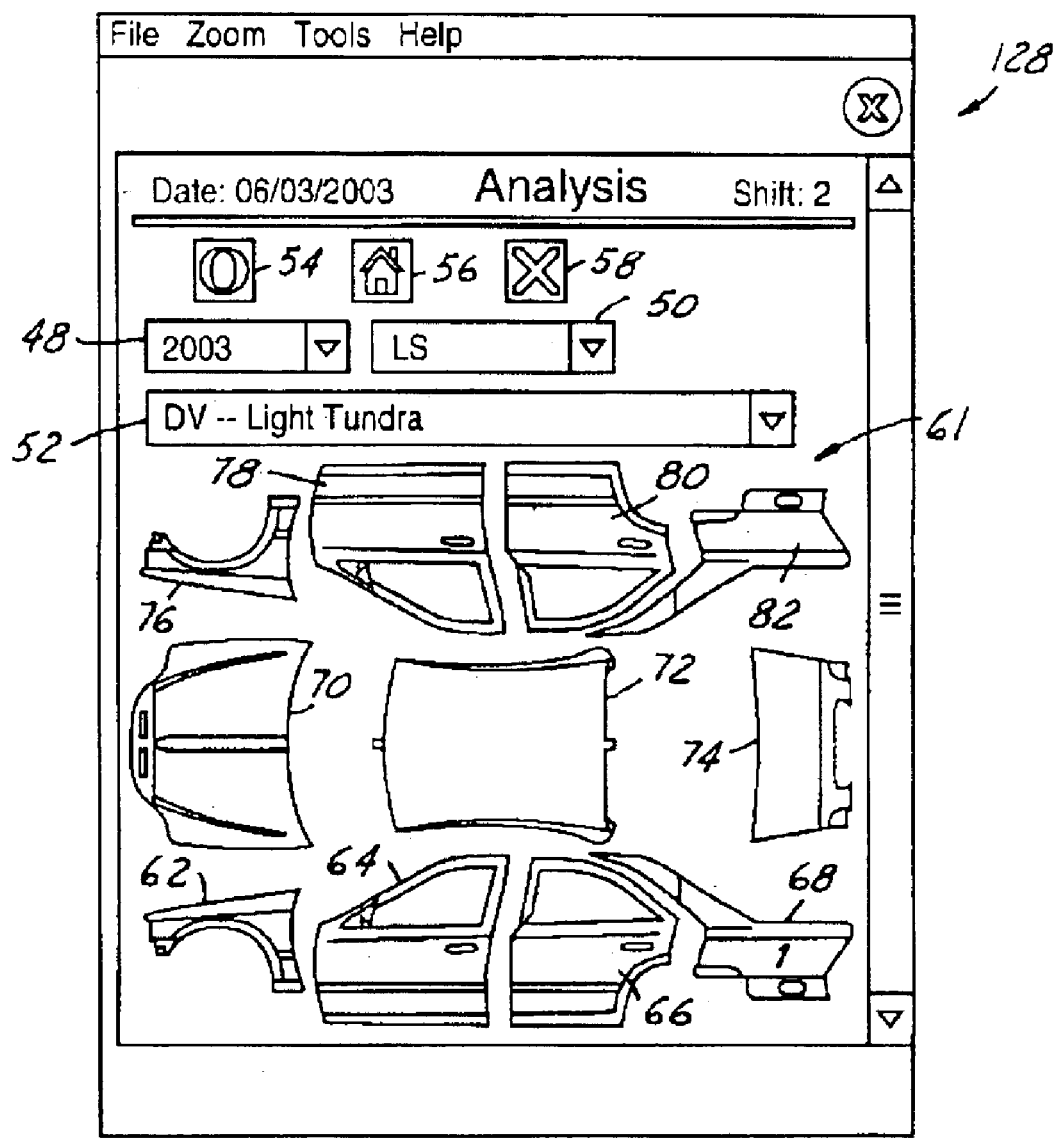
FIG. 5 illustrates a fourth screen display of the portable computer.

FIG. 5 illustrates a fourth screen display 128. The fourth screen display 128 indicates the total number of defects reported for the first-side rear corner portion 60. The fourth screen display appears once the inspector has finished inspecting a vehicle and selects the return button 120. As shown, only one defect was entered. The inspector can input additional defects by selecting one of the other body portions shown in FIG. 5. The above process is repeated for each body portion as necessary. The fourth screen display keeps a running total of the inputted defects.

The inspector exits the fourth screen display 128 and returns to the first screen display 44 by selecting the house button 56. At this point, the inspector can select the criterion for the next vehicle to be inspected. Optionally, and not shown in the Figures, an additional display can be provided by the graphical user interface. The additional display can be used to facilitate tracking the different vehicles being inspected.

The additional screen display is not always necessary because the defect data includes the defect descriptions. As such, the computer can be used to coordinate the reported defects. Moreover, each reported defect includes the vehicle model year, the vehicle model, the vehicle color, the paint defect description, and the defective paint layer as part of the defect data. The computer can use the defect data to separately track the different vehicles. Typically, the individual vehicles need not be identified at all as the defective vehicles are returned for repairs or other service. The computer primarily tracks the defect data according to the type of vehicle inspected and the number units (vehicles) inspected.

Returning to FIG. 1, the system 10 includes the computer 14. The computer 14 can received the defect data, generated as shown in FIGS. 2–4, from the portable computer 12 and store the defect data in the database 40. In this manner, the portable computer 12 facilitates reporting the results of the defect inspection to the computer 14. The computer 14 is also programmed to provided a graphical user interface to facilitate analysis of the reported defect inspection results. The computer 14 is preferably accessible by a number of inspectors in different assembly plants to facilitate the sharing of reported defect results.

The portable computer 12 facilitates the inspection and the reporting of the inspection results at each paint layer operation. In this manner, the inspector can inspect any number of vehicles at any point of the manufacturing process. The inspector may inspect a first vehicle after scuffing prior to adding the prime layer and then move on to inspecting a second and third vehicle after adding the second top-coat, and then move one to other vehicles in any desired order. For each inspected vehicle, the inspector selects the criterion for as shown in FIG. 2. The inspector completes a round of inspections and then transfers the defect data to the computer, as described above.

FIG. 6 a fifth screen display 136 for use with the computer 14. The fifth screen display 136 facilitates analysis of the reported defects in accordance with the present invention. The analysis preferably includes monthly tasks 138, daily tasks 140, and reference material 142. The analysis forces inspectors to achieve a check mark 144 in each event listed for each task. Preferably, the data accessible through FIG. 6 corresponds with a single assembly plant. The inspector can then report defects on a plant by plant basis. The data from each plant can then form an overall report.

Each task and the reference material are accessible through hyperlinks. The hyperlinks are indicated with the underlined portions in each Figure. Each hyperlink provides additional information. Check marks are received by the computer registering an inspector as having accessed the hyperlink. Optionally, the inspector may be required to actuate a submit button or take other confirmatory action once the hyperlinks has been accessed in order to receive a check mark. Preferably, the fifth screen display 136 is a web page which can be navigated through by clicking on the provided hyperlinks.

One aspect of the monthly tasks 138 is a voice of the customer task. The voice of the customer task requires the inspector to review a received customer report in order to receive a check mark. The customer report provides customer defect input to the inspector. In this manner, the inspector can review the defects which are apparent to the customer. The inspector can then make adjustments to the manufacturing process to limit the defects that are important to the customer. The adjustments can improve customer satisfaction. Moreover, tracking and reacting to the voice of the customer can help ameliorate warranty issues as warranty issues are typically reported by a customer's vehicle.

Table #1 shown below exemplifies the type of information that may be available by accessing the voice of the customer task hyperlink.

TABLE #1

2001 MODEL YEAR

| CONCERN | Aug-00 | Sep-00 | Oct-00 | Nov-00 | Dec-00 | Jan-01 | Feb-01 | Mar-01 | Apr-01 | May-01 | 2001 YTD | 2000 YTD |
|---|---|---|---|---|---|---|---|---|---|---|---|---|
| SATISFACTION | 85% | 85% | 84% | 82% | 82% | 83% | 82% | 86% | 84% | 87% | 84% | 85% |
| PAINT SHOP RESPONSIBLE: | | | | | | | | | | | | |
| Peeled Paint | 1 | 7 | 6 | 4 | 5 | 6 | 12 | 3 | 9 | 7 | 5 | 5 |
| Faded/Dull Paint | 4 | 4 | 5 | 6 | 6 | 3 | 9 | 11 | 6 | 2 | 5 | 6 |
| Sags/Runs in Paint | 7 | 5 | 5 | 7 | 11 | 12 | 7 | 7 | 11 | 13 | 7 | 8 |
| Thin/No Paint | 3 | 8 | 4 | 2 | 9 | 5 | 18 | 6 | 7 | 10 | 6 | 8 |
| Stained/Spotted Paint | 7 | 6 | 7 | 6 | 15 | 3 | 18 | 5 | 16 | 47 | 8 | 10 |
| Dirt in Paint | 4 | 9 | 5 | 8 | 5 | 7 | 8 | 8 | 11 | 15 | 6 | 10 |

TABLE #1-continued

2001 MODEL YEAR

| CONCERN | Aug-00 | Sep-00 | Oct-00 | Nov-00 | Dec-00 | Jan-01 | Feb-01 | Mar-01 | Apr-01 | May-01 | 2001 YTD | 2000 YTD |
|---|---|---|---|---|---|---|---|---|---|---|---|---|
| Uneven Color/Color Diff. Between Panels | 3 | 2 | 4 | 1 | 9 | 1 | 5 | 2 | 1 | 5 | 3 | 3 |
| Paint Spray Over Body Panel | 1 | 1 | 2 | 4 | 2 | 8 | 3 | 1 | 3 | 8 | 2 | 3 |
| PAINT SHOP SUB TOTAL | 30 | 42 | 38 | 38 | 62 | 45 | 80 | 43 | 64 | 107 | 42 | 53 |
| Body Rust | 2 | 5 | 4 | 1 | 1 | 4 | 0 | 1 | 0 | 26 | 3 | 2 |
| Detail Paint | 6 | 4 | 5 | 4 | 1 | 6 | 0 | 3 | 10 | 5 | 4 | 4 |
| Other Exterior Paint Troubles | 6 | 7 | 9 | 7 | 6 | 11 | 14 | 13 | 5 | 39 | 8 | 9 |
| PAINT LESS CHIP/SCRATCHED | 44 | 58 | 56 | 50 | 70 | 66 | 94 | 60 | 79 | 177 | 57 | 68 |
| Chipped Paint | 16 | 29 | 34 | 32 | 44 | 38 | 36 | 37 | 32 | 60 | 31 | 37 |
| Scratched Paint | 26 | 41 | 42 | 48 | 42 | 47 | 50 | 41 | 67 | 20 | 42 | 46 |
| CHIP AND SCRATCH TOTAL | 42 | 70 | 76 | 80 | 86 | 85 | 86 | 78 | 99 | 80 | 73 | 83 |
| TOTAL PAINT CONCERNS | 85 | 127 | 130 | 131 | 155 | 153 | 179 | 137 | 178 | 257 | 132 | 151 |

Table #1 could also be graphically displayed according to any number of other criterion. Preferably, each vehicle type to be inspected by the inspector is accessible.

One aspect of the monthly tasks is a vehicle response team (VRT) task. The vehicle response team task requires the inspector to form teams dedicated to specific areas of the manufacturing process. Preferably, the teams are charged with improving quality and cost. The vehicle response team check is received when a vehicle response team report has been written and presented to management. The section will provide tool to build team report-out documentation based on the defect data and actions. Table #2 shown below exemplifies the type of information that may be available by accessing the VRT review task hyperlink.

TABLE #2

| Area of Manufacturing Process | Team Members |
|---|---|
| Painting | XX, XXY, and XXX |

One aspect of the weekly tasks is a internal quality indicators task. The task requests the inspector to collect and optionally store defect data gathered by other inspection processes. Preferably, the defect data is gathered according to internal inspection points. In addition, the task provides data on internal customers and is also used to decide where to spend time on fixing defects. In some cases, a pareto chart is included. The internal quality indicators check is received if the inspector accesses the hyperlink and analyzes the internal data as it relates to the task at hand.

One aspect of the weekly tasks is a data collection task. The data collection task relates to the collection and reporting of results of the detailed defect inspection.

FIG. 7 illustrates a seventh screen 146 which appears if a charting/analysis hyperlink is accessed. The tasks includes a number of daily analysis tasks 148 and weekly analysis tasks 150.

The daily analysis task 148 each should received a check mark on a daily basis. The daily tasks generally relate to the inspector inspecting a number of defect charts automatically generated for the inspected vehicles. The tasks shown in FIG. 7 relate to inspecting the painting porting of the manufacturing process. The present invention is not limited to the only inspecting the painting portion of the manufacturing process, however.

In general, the painting portion of a vehicle manufacturing process comprises applying a number of paint layers to the vehicle. The paint layers include an e-coat layer, scuffing prior to adding a primer layer, adding the primer layer, scuffing the added primer layer, adding a first top-coat in a first booth (base coat), adding a second top-coat in a second booth (clear coat). The final product is inspected and polished before sending to the next assembly process.

It is desirable to inspect the paint layer after each paint layer operation. Moreover, it is desirable to monitor the defect inspection results for each paint layer operation. As such defect charts are provided. The defect charts include a e-coat before scuff chart, a prime before scuff chart, a prime after scuff chart, a top coat all booths chart, a top coat booth 1 char, a top coat booth 2 char, a after polish control chart, a dirt by layer pareto, and dirt by body portion.

Figure 8:
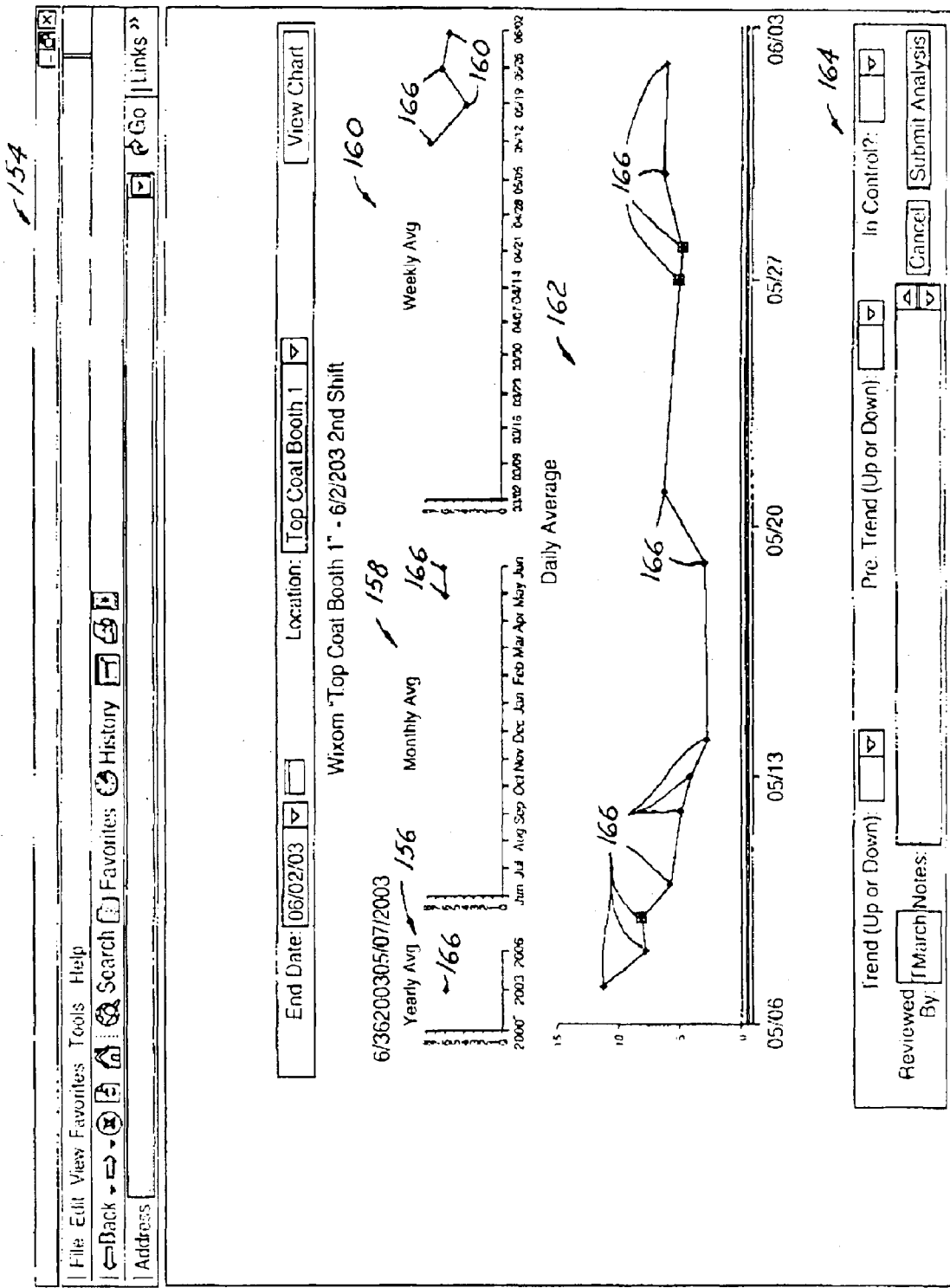
FIG. 8 illustrates a top coat booth 1 control chart generated by the computer.

FIG. 8 illustrates a top coat booth 1 control chart 154. The chart includes a daily average of defects relative to the top coat layer in booth 1. The chart allows the inspect to analyze the process for the top coat layer in booth 1 over time. A yearly chart 156, a monthly chart 158, a weekly chart 160, and a daily chart 162 are provided to facilitate the analysis. The charts allow an inspect to analyze the painting process at each assembly plant.

FIG. 8 also provides a note field 164 for the inspector to input additional comments. The notes can be requests for process controls and analysis or other commands. In this manner, the inspector can open action items for further investigations. For example, the weekly chart may indicate an increase in defects. In response, the inspector may kick off additional inspects by adding a note and submitting it for analysis with a submit analysis button.

Each marker 166 on the charts corresponds with an average defect count for the time period (daily, weekly etc.). Rolling over the marker brings up additional defect data regarding the particular defect. Table #3 shown below indicates some of the information available for a marker. Similar information is available for the non-daily markers on a average basis.

TABLE #3

Update the Notes for the Sub Task

| | |
|---|---|
| Paint Shop Code | WIX |
| Shift | 2 |
| Average | 5 |
| Units | 1 |
| Total Dirt Count | 5 |
| Date | May 27, 2003 |
| Notes: | Feather Duster not working properly |

Similar charts are available for each hyperlink shown in FIG. 8. The pareto charts present additional information in pareto form. Unlike the non-pareto charts, the pareto charts include defect data from other paint layer operations. This provides for a side-by-side analysis of the paint layers, rather than requiring the inspector to review each chart separately. This can be advantageous as the inspector may not appreciate the defect data due to an inability to review the side-by-side data in the other charts.

Each daily task receives a check mark when the inspector accesses the link and clicks on the submit analysis button. This forces the inspector to access each chart prior to receiving check marks. Preferably, the inspector is monitored by a supervising inspector. The supervising inspector can be in charge of monitor the painting process at a number of assembly plants. The computer is remotely accessible to provide such functionality. The supervising inspector can than monitor each plant inspector to insure the best analysis.

The weekly tasks receive check marks in a similar fashion. A dirt defect type by layer pareto link provides access to a pareto chart of all the defects at a plant for each paint layer. This charts shows the four layers in pareto format and the number of defects found in each layer. This helps the inspector determine where in the process to focus attention on defect reduction efforts.

Figure 9:
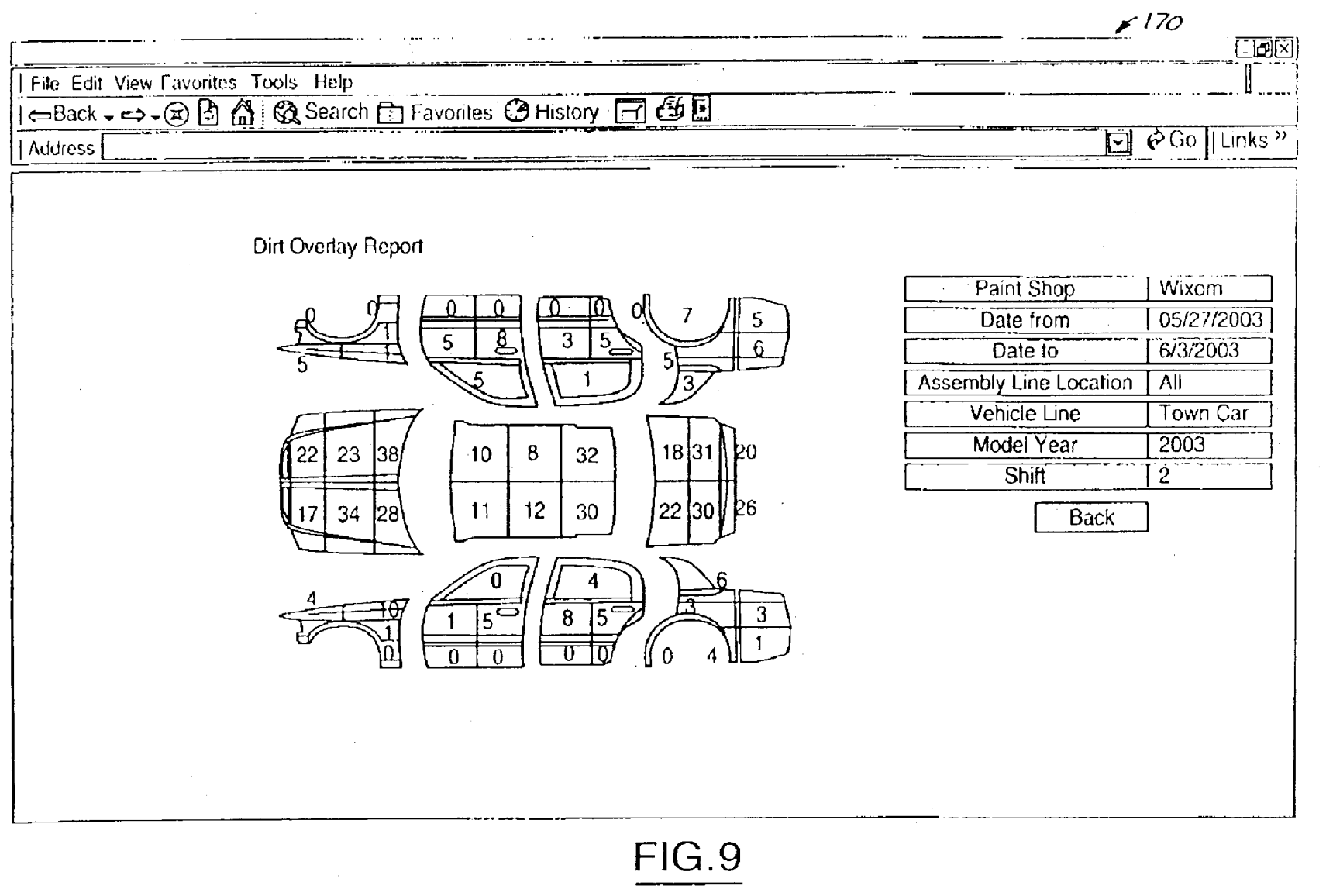

FIG. 9 illustrates a dirt overlay chart 170. The dirt overlay task forces the inspector to review a display having all the body portions of a selected vehicle. The display includes the total number of defects inputted for the vehicle. This is yet another means to insure the inspector is reviewing the defect data. Each displayed body portion can then be accessed to provide further detail. Preferably, clicking on the body portion brings up the further detail.

Figure 10:
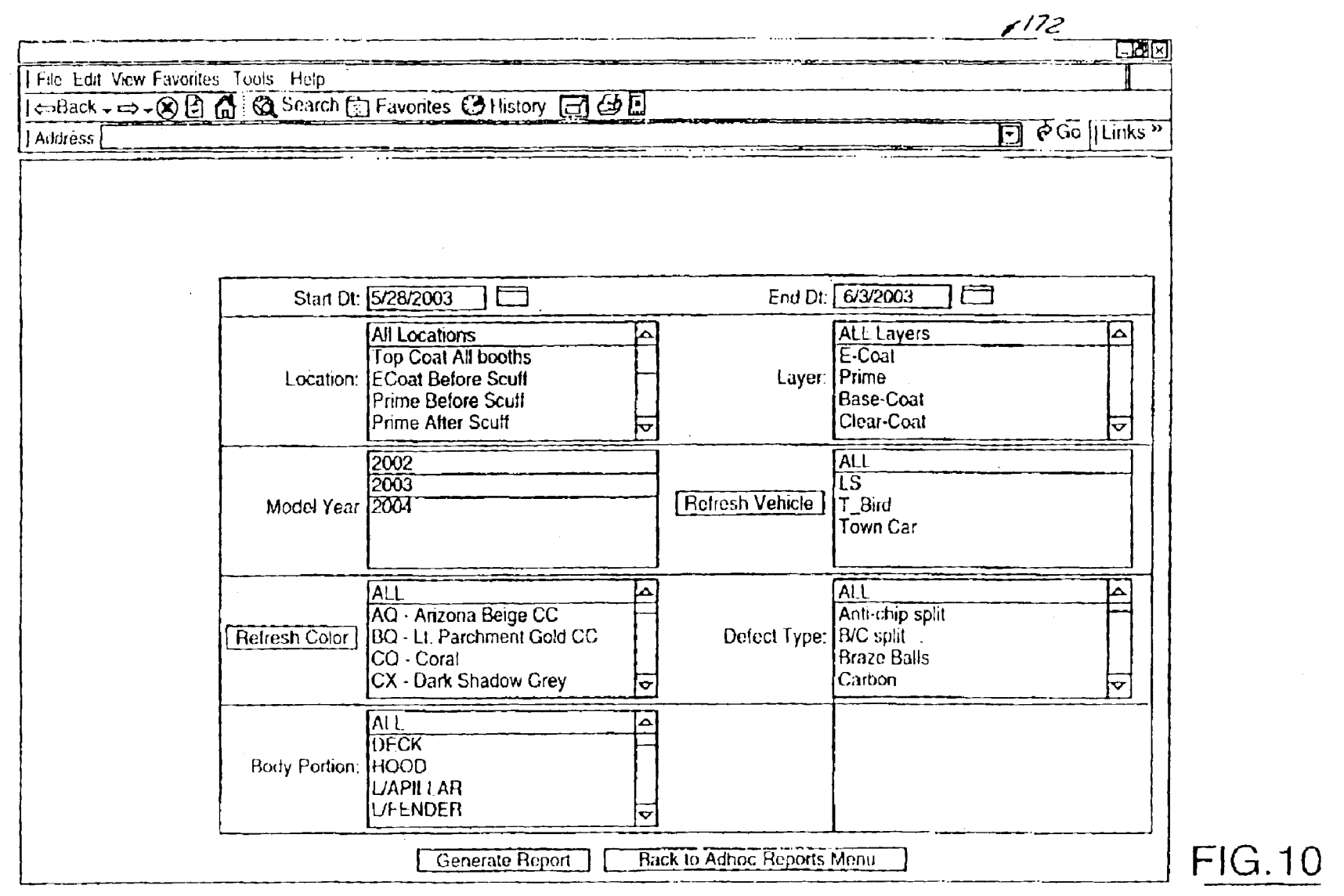

FIG. 10 is an additional aspect of charting/analysis. FIG. 10 is accessed by accessing an ad hoc reporting link 172. A selection screen 174 includes a number of criterion for generating a chart. The chart is then analyzed by the inspector. The selection screen includes fields for a start date, an end date, a plant location, a vehicle model year, a vehicle color, a vehicle body portion, a paint layer, a vehicle model, and a defect type.

Preferably, the inspector has instructions to analyze different combinations of criterion or the inspector can determine a set of criterion to analyze. For example, the inspector may receive a warranty notification. The warranty notification may necessitate going back in time to determine what defect data was reported. The inspector can enter the dates to facilitate charting and then analyzing the charted data. This can help the inspector solve the warranty issue. Likewise, the inspector may desire to check different charts periodically. Any combination of criterion can be selected for generating charts and analyzing the generated charts.

Returning to FIG. 6, one aspect of the daily tasks is a defect actions task. The defect actions task relates to quality control. The defect action task hyperlink accesses the information contained below in Table #4.

TABLE #4

| # | Concern (D2) | Criteria | Responsible (D1) | A | Containment Action (D3) | Open Date | Root Cause (D4) | Permanent Action (D5) | Close Date | Attachments | Verification | % Impr. |
|---|---|---|---|---|---|---|---|---|---|---|---|---|
| | | | | | Base-Coat | | | | | | | |
| 12 | Basecoat Splits (primarily left side) | ... Layer: Base-Coat Loc: Top Coat B.2 D/Type: B/C Split | Terry.Manns Nolan.Ely | 1 | Sand/ Polish/ repaint | 05/30/2003 | ... | ... | ... | Add/View | ... ... | ... |
| | | | | | Clear-Coat | | | | | | | |
| 11 | Carbon Appearing as dirt in the Clear Coat | ... Layer: Clear Coat Loc: Top Coat B.1 D/Type: Unknown | Terry.Manns Nolan.Ely | ... | 100% inspection/ spillout - polish, spot or repaint | 06/15/2002 | High temp filter allowing carbon to enter Enamel 1 oven #3z | Replaced Hi-temp filters in Enamel #1 zone 3 | 06/15/2002 | Add/View | FAI 50 FTT 85% | FAI 30 FTT 90% | ... |

Table #4 includes a number of concerns. The concerns relate to defects or potential defects. Each concern includes a containment action. The containment action describes what should be done to limit to occurrences of the defect. The inspector is forced to continually review and update the form in order to receive a defect actions check mark. In this manner, the inspector's attention is focused on correction of the defect.

Table #4 includes a criteria section, a responsibility section, an open date section, a root cause section, a close date section, an attachment section, a verification section and a percent improved section. The "action task" is a problem solving tool that leads people through the process from containment to permanent resolution. Not shown in the table are the action buttons where a new action can be added, search capability and print capability. Clicking the hyperlink portion in any column will take you to a screen where you can modify or add information.

Concern (02) is a description of the concern being worked on. Criteria shows what the defect is and in which layer and inspection location it was found. Responsible indicates the team members responsible to take the lead on fixing this issue. "A" indicates if there are any assignments related to this issue. Clicking on this will take you to an assignment application where details of the assignment are visible. Containment identifies the actions being taken to keep the issue from progressing through the process while a permanent solution is under investigation. Root Cause identifies what the root cause of the issue is (when found). Permanent Action describes what actions were taken that eliminated the problem and the need for containment actions. Attachments provide a place for the team to attach items such as photos or reports that help the team in problem resolution and knowledge retention for the future. Verification provides a method to record before and after numbers that relate to the quality of the issue so that progress can be measured and determine when problem is solved. % Impr is a calculation on the before and after verification numbers to determine percent improvement reported defects. Contact information for each dirt team member is available, as shown below in Table #5. The contact information is beneficial to facilitate reaching dirt team members from other plants. In some cases, it may be beneficial to contact a member in another plant to discuss a solution to a defect.

TABLE #5

| NAME | PHONE NUMBER | E-MAIL | PLANT LOCATION |
| --- | --- | --- | --- |

One reference material relates to a defect library. The defect library provides images of known defects. The defect library can include images of paint defects, foreign contaminant defects, rust defects, weld defects, structural defects such as dents and scratches, and others. The inspector can access the image to assist with identifying defects. The inspector can also add images to the defect library. The added defect images can alert other inspectors to new types of defects.

One reference material relates to an reaction/containment plan. The reaction/containment plan is shown below in Table #6. The reaction/containment plan generally relates to a problem solving tool. The concept is to take major or frequently re-occurring issues and distil the important data into a searchable matrix for the plant floor people to use if a problem happens again at a later date. For example, if the inspector sees that there is carbon in the clearcoat layer, the inspector can reference the reaction/containment plan process to identify the steps to contain the issue and begin the process to fix the problem. It is a tool to tell people what to do to contain and resolve issues that have been fixed before. However, if the known fixes do not solve the problem, a new problem should be opened and the solutions identified from the new problem will be added to the list of potential solutions in the containment/reaction plan.

TABLE #6

Plant Shop: Wixom
Containment Information
Search Retrieved -1- rows

| Item No. | Last Updated | Issue/Concern | Location (Escape Point D4) | Reaction/Containment Action Statement | Detailed Action Description Including Personnel & Material Required |
| --- | --- | --- | --- | --- | --- |
| 1 | 05/30/03 | Carbon in the Clear | . . . | Sand/polish/repaint | 5/30/03 Typical root cause is dirty combustion . . . |

Returning to FIG. 6, reference material is provided. The reference material is accessed through hyperlinks. The reference material permits the inspectors at each plant to build a knowledge base that can be shared with inspectors from other plants. The knowledge base can help facilitate problem solving.

One reference material relates to a dirt team. The dirt team indicates member responsible for one or more of inspecting vehicle, repairing defective vehicle, and analyzing the One reference material relates to a control plan. The Control Plan identifies the minimum requirements in data gathering and analysis charting to maintain the knowledge about the process being monitored. This will provide a statistically significant amount of data on which decisions can be made, making sure that the team is focused on significant events and not random noise. The control plan is shown below in Table #7.

TABLE #7

| | | | | | | Eng. Specification | | | | | |
|---|---|---|---|---|---|---|---|---|---|---|---|
| | | End Item and Customer Spillout | | | | Paint Engineering/WAP | | | | | |
| | | Machine Device | | | | PLANT Wixom Assembly Plant | | | | Wixom Specific | |
| | | Tools for | Characteristic | | | | | | 12-May-03 | Control Plan | |
| Matrix No. | Process Name | Manufac-turing | Process Parameters | Product Characteristic | Class | Upper Units | Nominal | Lower | Method | Frequency | Analysis Method | Reaction Plan |
| 1 | Dirt | E-Coat | E-Coat Before Scuff | Dirt Count | U | | | | Visual Inspection | 5 units/ Daily/ Dispersed | Trend & Pareto | |
| 8 | | Prime | Prime Before Scuff | Dirt Count | U | | | | Visual Inspection | 5 units/ Daily/ Dispersed | Trend & Pareto | |
| 9 | | Prime | Prime After Scuff | Dirt Count | U | | | | Visual Inspection | 5 units/ Daily/ Dispersed | Trend & Pareto | |
| 10 | | #1 Color Booth | Booth #1 Before Polish | Dirt Count | U | | | | Visual Inspection | 10 units/ Daily/ Dispersed | Trend & Pareto | |
| 11 | | #2 Color Booth | Booth #2 Before Polish | Dirt Count | U | | | | Visual Inspection | 10 units/ Daily/ Dispersed | Trend & Pareto | |
| 12 | | OK Line | After Polish | Dirt Count | U | | | | Visual Inspection | 10 units/ Daily/ Dispersed | Trend & Pareto | |
| 13 | | E-Coat | E-Coat Before Scuff | Analyzed Dirt | U | | | | Visual Inspection | 2 units/ Daily/ Dispersed | Pareto | |
| 14 | | Prime | Prime Before Scuff | Analyzed Dirt | U | | | | Visual Inspection | 2 units/ Daily/ Dispersed | Pareto | |
| 15 | | #1 Color Booth | Booth #1 Before Polish | Analyzed Dirt | U | | | | Visual Inspection | 3 units/ Daily/ Dispersed | Pareto | |
| 16 | | #2 Color Booth | Booth #2 Before Polish | Analyzed Dirt | U | | | | Visual Inspection | 3 units/ Daily/ Dispersed | Pareto | |

One reference material relates to a maintenance plan. The maintenance actions is a tool that provides the team with a place to store re-occurring maintenance action that were found to solve previous defect problems. For example, if the team solved a problem by identifying that a critical filter needed to be changed every 90 days to avoid a defect issue, that information would be entered into the maintenance action tool which would then remind the inspector to make sure that the required action really did take place, and if not to make sure that it does. The maintenance plan is shown below in Table #8.

TABLE #8

Wixom DiP Maintenance Actions

| # | Maintenance Required | Responsible | Frequency (in days) | Date Last Done | Reaction Plan # | Issue |
|---|---|---|---|---|---|---|
| 1 | Change booth filters | Booth cleaner | 90 days | 03/02/02 | Wix012 | Clogged filters contribute to dirt in paint on the hood |
| 2 | Clean feather duster | Vendor | 120 days | 3/2/02 | Wix032 | Dirty feathers adding more dirt than taking away |

While the best mode for carrying out the invention has been described in detail, those familiar with the art to which this invention relates will recognize various alternative designs and embodiments for practicing the invention as defined by the following claims.

What is claimed:

1. A portable computer to facilitate reporting results of a defect inspection of an object having multiple body portions, the portable computer programmed to:
    provide a graphical user interface to graphically display the multiple body portions of the object;
    receive a defect input from an inspector indicating a defect in one or more of the body portions;
    generate defect data representing which body portion has the defect; and
    wherein the graphical user interface is programmed to display multiple body portions comprising a vehicle body, and wherein the computer includes a touch screen having individual touch portions corresponding with each of the multiple body portions such that the clicking on the touch screen indicates the body portion corresponding with the defect.

2. The computer of claim 1 wherein the graphical user interface is programmed to display multiple body portions comprising a vehicle body.

3. The computer of claim 2 wherein the graphical user interface is programmed to provide a menu corresponding to a number of vehicle bodies for use by the inspector to select the vehicle body, wherein the multiple body portions comprising the selected vehicle body are displayed.

4. The computer of claim 3 wherein the graphical user interface is further programmed to divide each body portions into a number of smaller body portions, wherein the defect signal indicates the body portion and the smaller body portion of the defect.

5. The computer of claim 1 wherein the graphical user interface is programmed to provide a menu comprising a number of defect descriptions for use by the inspector to select a defect description for the defect, and wherein the defect signal further represents the defect description.

6. The computer of claim 5 wherein the defect description is an in-process paint layer description, wherein the in-process paint layer description indicates a paint layer in which the defect occurred.

7. The computer of claim 6 wherein the in-process paint layer description relates to a vehicle assembly process and indicates the defect occurred after one of adding an e-coat layer, scuffing prior to adding a primer layer, adding the primer layer, scuffing the added primer layer, adding a first top-coat in a first booth, adding a second top-coat in a second booth, or after polishing the second top-coat.

8. The computer of claim 1 further programmed to store multiple defect signals for transfer to a computer.

9. The computer of claim 1 wherein the computer is programmed to store a number of defect signals, and wherein the computer is further programmed to transfer the stored defect signals to a computer during a docking with the computer.

10. The computer of claim 1 wherein the computer further comprises a sound receiver to receive a voice command from the inspector and wherein the computer is programmed to receive the voice command as the defect input.

11. The computer of the claim 1 wherein the computer is a hand-held personal digital assistant.

12. The computer of claim 1 wherein the computer is programmed to received the defect input for a visually perceptible defect.

13. A computer readable program for use in a portable computer to facilitate visually inspecting an object having multiple body portions, the computer readable program comprising instructions to:
    provide a graphical user interface to graphically display the multiple body portions of the object;
    receive a defect input from an inspector indicating a visually perceptible defect in one or more of the body portions;
    generate a defect signal representing which body portion received the defect; and
    wherein the graphical user interface is instructed to display multiple body portions comprising a vehicle body, and wherein the computer includes a touch screen having individual touch portions corresponding with each of the multiple body portions such that the clicking on the touch screen indicates the body portion corresponding with the defect.

14. The program of claim 13 wherein the graphical user interface is programmed to display multiple body portions comprising a vehicle body.

15. The program of claim 13 wherein the graphical user interface is programmed to provide a menu corresponding to a number of vehicle bodies for use by the inspector to select the vehicle body, wherein the multiple body portions comprising the selected vehicle body are displayed.

16. The program of claim 13 wherein the graphical user interface is programmed to provide a menu comprising a number of defect descriptions for use by the inspector to select a defect description for the defect, and wherein the defect signal further represents the defect description.

17. A system to facilitate reporting results of a defect inspection of an object having multiple body portions, the system comprising:
    a portable computer to provide a graphical user interface to graphically display the multiple body portions, wherein a defect input is received by the portable computer to indicate a defect in one or more of the body portions, and wherein the portable computer generates defect data representing which body portion has the defect;
    a computer to receive the defect data from the portable device to facilitate analyzing the defect data; and
    wherein the computer provides a number of weekly tasks to facilitate analyzing the defect data on a weekly basis, wherein the number of weekly tasks require an inspector to execute each task to receive a check mark to indicate completion of the task such that a supervisor can review the check mark to determine whether the inspector is analyzing the defect data on a regular basis.

18. The system of claim 17 wherein the defect data is received by the computer for use in automatically providing predefined defect charts to facilitate analyzing the defect data, and wherein the weekly tasks further include analyzing the predefined defect charts to receive a check mark for each analyzed defect chart.

* * * * *